United States Patent
Laslo et al.

(10) Patent No.: US 9,364,781 B2
(45) Date of Patent: Jun. 14, 2016

(54) METHOD AND APPARATUS FOR WET DESULFURIZATION SPRAY TOWERS

(71) Applicant: ALSTOM Technology Ltd, Baden (CN)

(72) Inventors: Dennis James Laslo, Ten Mile, TN (US); Karl Hognefelt, Knoxville, TN (US); Rikard Häkansson, Växjö (SE); Kerstin Forsgren, Växjö (SE); Fredrik Jens Brogaard, Växjö (SE)

(73) Assignee: ALSTOM Technology Ltd, Baden (CH)

( * ) Notice: Subject to any disclaimer, the term of this patent is extended or adjusted under 35 U.S.C. 154(b) by 64 days.

(21) Appl. No.: 14/051,734

(22) Filed: Oct. 11, 2013

(65) Prior Publication Data

US 2015/0101485 A1    Apr. 16, 2015

(51) Int. Cl.
*B01D 47/06*    (2006.01)
*B01D 53/50*    (2006.01)
*B01D 53/79*    (2006.01)

(52) U.S. Cl.
CPC .............. *B01D 47/06* (2013.01); *B01D 53/504* (2013.01); *B01D 53/79* (2013.01); *B01D 2247/04* (2013.01); *B01D 2247/08* (2013.01); *B01D 2247/106* (2013.01); *B01D 2251/404* (2013.01); *B01D 2251/606* (2013.01); *B01D 2259/126* (2013.01)

(58) Field of Classification Search
None
See application file for complete search history.

(56) References Cited

U.S. PATENT DOCUMENTS

| | | | |
|---|---|---|---|
| 2,523,441 A | 9/1950 | McKamy | |
| 2,589,956 A | 3/1952 | Panteleieff | |
| 3,532,595 A | 10/1970 | Arnesjo et al. | |
| 3,691,731 A | 9/1972 | Garcia | |
| 4,164,399 A | 8/1979 | Kannapell | |
| 4,583,999 A | 4/1986 | Lindahl et al. | |
| 5,474,597 A | 12/1995 | Halldin | |
| 5,635,149 A * | 6/1997 | Klingspor et al. | 423/243.08 |
| 2008/0079181 A1* | 4/2008 | Laslo | 261/115 |
| 2011/0203456 A1* | 8/2011 | Hakansson | 95/224 |

FOREIGN PATENT DOCUMENTS

| | | |
|---|---|---|
| DE | 3341318 A1 | 5/1985 |
| DE | 19758526 A1 | 6/1999 |
| DE | 10033781 C1 | 12/2001 |

(Continued)

OTHER PUBLICATIONS

European Search Report for EP Appln. No. 14187379.4 dated Feb. 19, 2015.

*Primary Examiner* — Duane Smith
*Assistant Examiner* — Phillip Shao
(74) *Attorney, Agent, or Firm* — Rita D. Vacca (57) ABSTRACT

A method and apparatus or system is provided for cleaning a flue gas and/or cooling a flue gas with a dispersed finely divided absorption liquid. As such, the absorption liquid is dispersed in a wet scrubber through which flue gas flows for absorption liquid and flue gas intermingling and contact to produce a cleaned flue gas. The absorption liquid supplied to the wet scrubber is dispersed from upwardly spraying anti-clogging nozzles and downwardly spraying nozzles arranged to maximize absorption liquid and flue gas contact with minimal spray interference between nozzles.

8 Claims, 3 Drawing Sheets

(56) References Cited

FOREIGN PATENT DOCUMENTS

| EP | 2 361 667 | A1 | 8/2011 |
| JP | H06 198121 | A | 7/1994 |
| JP | 2011 255370 | A | 12/2011 |

\* cited by examiner

METHOD AND APPARATUS FOR WET DESULFURIZATION SPRAY TOWERS

TECHNICAL FIELD

The present disclosure provides in general a method and apparatus or system for cleaning polluted gas and/or cooling of hot gas by contacting the gas with a finely divided liquid for absorption of gaseous pollutants and/or cooling of the gas. More specifically, the present disclosure provides a method and apparatus or system directed to nozzles resistant to clogging used in a nozzle configuration for cleaning polluted gas and/or cooling of hot gas by contacting the gas with a finely divided liquid for absorption of gaseous pollutants and/or cooling of the gas.

TECHNICAL BACKGROUND

Cleaning of polluted gas with a view to removing particulate or gaseous substances is an important and common process in today's industrialized society. A vast variety of techniques have been developed, and today there are often several methods to choose between when a gas cleaning plant is to be designed, even when very specific pollutants are to be removed.

Particulate pollutants are often removed by means of dynamic separators, such as cyclones, electrostatic precipitators or barrier filters, bag filters or cassette filters.

Gaseous pollutants are generally removed using an additive, either by absorption by the additive supplied in either dry or wet form, or by reacting gaseous pollutants with the additive supplied in either gaseous or liquid form, so as to obtain a particulate product. The reaction product is thereafter separated in a particle separator.

Cooling gas with a view to adapting the gas's temperature or to recovering heat therefrom, is also an important and common process. Heat transfer generally takes place either by means of heat exchangers of recuperative or regenerative type or by direct contact between the hot and the cold medium. Since this invention concerns heat transfer by direct contact between a gas and a liquid, other techniques will not be discussed.

One method advantageous in many respects consists of conducting a gas through a "rain" of finely divided liquid or past surfaces overflowed by a liquid. These methods make it possible to cool a hot gas as well as to capture particles in the liquid and to absorb or to react gaseous pollutant components of a polluted gas with the liquid. The liquid may also contain substances causing or promoting dissolved gaseous pollutant components to form solid particulates for easier separation thereof from the liquid.

The liquid is normally recycled in the contact device, but a portion thereof is removed, generally continuously, in order to use its heat in other applications and/or to be treated to separate pollutants therefrom. Thus the cooled and/or treated liquid can be recycled to the contact device to be used again.

Polluted gas washing plants can include contact devices or open towers where the polluted gas only encounters a finely divided liquid, and packed scrubbers or packed columns where the polluted gas flows through a tower filled with e.g. saddle-shaped or coil-shaped small parts, onto which liquid is sprayed so as to produce a liquid film which flows downwardly over essentially the entire total surface. However, since packed scrubbers do not fall within the field of the subject disclosure, such will not be discussed further herein.

Examples of contact devices or open towers, e.g. for separating sulphur dioxide from a polluted gas and/or for cooling of the gas in order to recover heat, are disclosed in U.S. Pat. No. 3,532,595. As such, U.S. Pat. No. 3,532,595 discloses both vertical towers and scrubbers with horizontal gas flow and liquid supplied at several levels or positions. U.S. Pat. No. 4,164,399, discloses a tower of less complex design, where liquid is supplied only at one level but is distributed after capture at several levels. U.S. Pat. No. 2,523,441, discloses a combination of an open tower with a packed section.

The above-noted techniques require that the liquid used in the contact device falls or flows downwardly by gravity. It is however also known to design contact devices or scrubbers which generate more or less horizontal liquid curtains through which the polluted gas flows. Two examples are disclosed in U.S. Pat. No. 2,589,956 and U.S. Pat. No. 3,691,731.

An intermediate design is disclosed in U.S. Pat. No. 4,583,999, wherein the washing liquid is supplied horizontally but, after some deceleration, descends as a rain of finely divided droplets.

Another gas contact device or tower is disclosed in DE-A1 33 41 318 or U.S. Pat. No. 3,532,595, wherein liquid is supplied at 4 to 6 levels. Each level has several nozzles to distribute small liquid droplets for gas and liquid contact. As such, each level is provided with nozzles arranged with a spacing of 0.5-1 meters (m), in a regular lattice. The distance between the levels is 1-2 m. The efficiency of the contact device or tower is largely dependent on the relative movement between the droplets and the gas. It is therefore generally preferred that the gas flows upwardly in a direction contrary to the descending liquid droplets, i.e. counter currently, but for various reasons there also exist gas contact devices or towers in which the gas descends in the same direction as the descending droplets, i.e. concurrently.

If it is desirable to increase the gas treatment efficiency using this method, it is necessary either to increase the height of the tower or to increase the flow of liquid. Whichever option is chosen, the consequence is increased pump work for a given volume of gas flow. Open gas contact devices or towers also suffer from the major disadvantage of requiring significant space. Significant space requirements also mean significant associated building costs since the towers typically must be relatively tall. As such, liquid to descend through the tower in the form of a rain of fine droplets must first be pumped up to a considerable height. Such pump work significantly increases operational costs associated with gas treatment.

Another open spray tower system is disclosed in U.S. Pat. No. 5,474,597. The open spray tower as disclosed uses nozzles arranged in a pattern whereby nozzles spraying liquid upwardly in the same direction as that of gas flow alternate with nozzles spraying liquid downwardly in the opposite direction as that of gas flow, for purposes of improving mass transfer. A disadvantage of the system is that the nozzles arranged to spray liquid upwardly plug when the system is not in operation and without a flow of liquid. When not in operation, accumulated slurry and particulates from nozzles arranged above spraying liquid downwardly caused plugging of unused nozzles, or worse yet, back flow into associated pumps.

Gas cleaning and gas cooling in wet-type contact devices or scrubbers, has for many decades been a well-established technique in process industries, power plants and incineration plants. Even with certain drawbacks, such as those noted above, this technique is well tried and must be considered both efficient and reliable. However, a significant drawback to such wet-type contact devices or scrubbers is spray nozzle clogging resulting in inefficient gas cleaning and gas cooling.

The drawback of spray nozzle clogging needs to be addressed. As such, a method and/or apparatus that addresses costly nozzle clogging and the inefficient gas cleaning/cooling resulting therefrom is needed.

SUMMARY

The subject disclosure provides both a method and an apparatus or system that address costly nozzle clogging and the inefficient gas cleaning and/or gas cooling resulting therefrom. As such, the present disclosure relates to a method and an apparatus or system for cleaning polluted gas and/or cooling of hot gas, wherein the gas is contacted with a finely divided liquid for the separation of particulates, absorption of gaseous pollutants and/or cooling of the gas. The finely divided liquid is supplied using anti-clogging nozzles arranged within a pattern of nozzles in two or more planes substantially perpendicular to the main flow direction of the gas flowing through the apparatus or system.

To address costly nozzle clogging and resultant inefficient gas cleaning/cooling, anti-clogging nozzles are used within a pattern of nozzles to supply finely divided liquid for contact with a gas for gas cleaning and/or gas cooling. The subject anti-clogging nozzles are dual orifice nozzles with a majority of an amount of liquid flow flowing in one first direction, and a relatively small amount of liquid flow flowing in another second direction. The relatively small amount of liquid flow discharged in the second direction has little effect during nozzle operation. However, when the nozzle is not in operation, the relatively small amount of liquid flow discharged from the nozzle in the second direction provides a drainage route for particulate matter that would otherwise clog the opposed nozzle that discharges in the first direction. Thereby, the relatively small amount of fluid flow in the second direction serves to reduce or eliminate nozzle clogging often associated with the cleaning of polluted gas and/or cooling of hot gas. Also, the subject anti-clogging nozzles reduce or eliminate operation costs associated with frequent nozzle cleaning and/or replacement as previously required.

In summary, the subject apparatus or system comprises a wet scrubber with at least a first spray level and a second spray level, each equipped with downwardly spraying nozzles arranged in vertical alignment one above the other, and upwardly spraying anti-clogging nozzles alternating between the downwardly spraying nozzles also arranged in vertical alignment one above the other. Each of the upwardly spraying anti-clogging nozzles has an upward extending portion and an opposed extended portion operable for particulate flow from the upward extending portion to the opposed extended portion to prevent particulate clogging of the upward extending portion of the upwardly spraying anti-clogging nozzle. The subject apparatus or system may further comprise additional spray levels equipped with like arranged downwardly spraying nozzles and upwardly spraying anti-clogging nozzles, such as from 1 to 18 additional spray levels. As such, a flue gas produced in a boiler flows upwardly through the wet scrubber where an absorption liquid is atomized or dispersed as a finely divided spray from at least a portion of the downwardly spraying nozzles and at least a portion of the upwardly spraying anti-clogging nozzles. Preferably, about 90% or more of the absorption liquid dispersed from the upwardly spraying anti-clogging nozzles is sprayed upwardly from the upward extending portion thereof and about 10% or less of the absorption liquid sprayed from the upwardly spraying anti-clogging nozzles is sprayed downwardly from the opposed extended portion. Alternatively, preferably, about 80% or more of the absorption liquid dispersed from the upwardly spraying anti-clogging nozzles is sprayed upwardly from the upward extending portion thereof and about 20% or less of the absorption liquid sprayed from the upwardly spraying anti-clogging nozzles is sprayed downwardly from the opposed extended portion. Absorption liquid so sprayed from the nozzles contacts the flue gas flowing through the wet scrubber and absorbs acid gases therein to produce a cleaned flue gas. Preferably for this purpose, the absorption liquid is a limestone absorption liquid or slurry. To significantly reduce or eliminate particulate clogging of the upwardly spraying anti-clogging nozzles, the same are operable to remove particulates from the upward extending portion thereof through the opposed, smaller sized, extended portion.

In summary, the subject method comprises supplying an absorption liquid to a wet scrubber with at least a first spray level and a second spray level, each spray level equipped with downwardly spraying nozzles arranged in vertical alignment one above the other, and upwardly spraying anti-clogging nozzles alternating between the downwardly spraying nozzles also arranged in vertical alignment one above the other. Each upwardly spraying anti-clogging nozzle includes an upward extending portion and an opposed extended portion operable for particulate flow from the upward extending portion to the opposed extended portion to prevent particulate clogging of the upward extending portion. The subject method further comprises contacting a flue gas produced in a boiler flowing upwardly through the wet scrubber with the absorption liquid to produce a cleaned flue gas. According to the subject method, the wet scrubber may also include additional spray levels equipped with like arranged downwardly spraying nozzles and upwardly spraying anti-clogging nozzles. The preferred absorption liquid is a limestone absorption liquid or slurry is atomized or dispersed as a finely divided spray from at least a portion of the downwardly spraying nozzles and at least a portion of the upwardly spraying anti-clogging nozzles. About 90% or more of the absorption liquid sprayed from the upwardly spraying anti-clogging nozzles is sprayed upwardly from an upward extending portion thereof and about 10% or less of the absorption liquid sprayed from the upwardly spraying anti-clogging nozzles is sprayed downwardly from an opposed extended portion. Alternatively, about 80% or more of the absorption liquid sprayed from the upwardly spraying anti-clogging nozzles is sprayed upwardly from an upward extending portion thereof and about 20% or less of the absorption liquid sprayed from the upwardly spraying anti-clogging nozzles is sprayed downwardly from an opposed extended portion. Accordingly, the upwardly spraying anti-clogging nozzles are operable for particulate removal from the upward extending portion thereof through the opposed, smaller sized, extended portion.

Further objects and features of the present disclosure will be apparent from the following description and claims.

BRIEF DESCRIPTION OF THE DRAWINGS

The invention will now be described in more detail with reference to the accompanying drawings, in which:

FIG. 1 is schematic cross-sectional view of a wet scrubber system according to the subject embodiment;

FIG. 2 is an enlarged schematic side view of the circled nozzles of FIG. 1 referenced as II;

FIG. 3 is a schematic top view of the nozzles of FIG. 2; and

FIG. 4 is a schematic side cross sectional view of the nozzles of FIG. 2.

DETAILED DESCRIPTION

FIG. 1 schematically illustrates the subject apparatus or system 10 comprising a wet scrubber 12 useful for cleaning a polluted process gas and/or for cooling a hot process gas. Spray apparatus 13 in wet scrubber 12 is operative for removing at least a portion of a sulphur dioxide content of a process gas, in the form of a flue gas, FG, generated in a boiler 15 operative for combusting a fuel F, such as coal or oil. Flue gas FG flows from boiler 15 through fluidly connected duct 15a into fluidly connected inlet 16 of wet scrubber 12.

Figure 1:
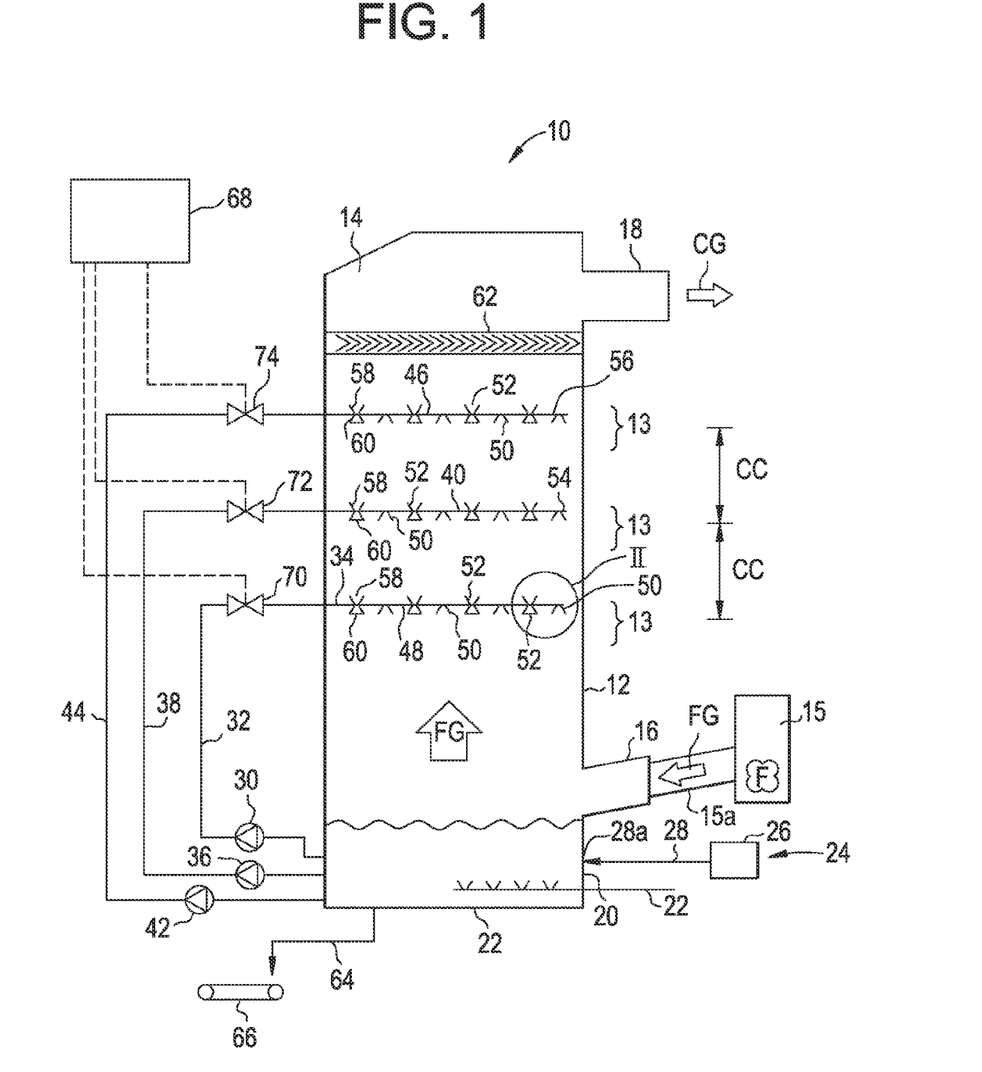

The wet scrubber 12 comprises a vertical open tower 14, an inlet 16 for flue gas FG to be cleaned and/or cooled, and an outlet 18 for cleaned flue gas CG from which at least a portion of the sulphur dioxide content has been removed. An absorption liquid tank 20 is arranged at a bottom 22 of the vertical open tower 14. The absorption liquid tank 20 is provided with an oxidation arrangement 22. Fresh limestone, $CaCO_3$, is supplied to the absorption liquid tank 20 through an inlet 28a from an absorbent supply device 24 comprising a limestone storage 26 fluidly connected to a supply pipe 28 fluidly connected to inlet 28a. It will be appreciated that absorption liquid tank 20 may, as an alternative, be positioned outside of vertical open tower 14, and that the supply of fresh limestone could, as an alternative, enter the vertical open tower 14 at locations other than the absorption liquid tank 20, as a dry powder, a slurry or both.

The wet scrubber 12 further comprises a first circulation pump 30 which circulates through a fluidly connected absorption liquid circulation pipe 32, a limestone absorption liquid, sometimes referred to as a limestone slurry, from the absorption liquid tank 20 to a fluidly connected first spray level system 34 positioned vertically lowest and within closest proximity to bottom 22 within vertical open tower 14. The wet scrubber 12 further comprises a second circulation pump 36 which circulates through a fluidly connected absorption liquid circulation pipe 38, a limestone absorption liquid from the absorption liquid tank 20 to a fluidly connected second spray level system 40 positioned vertically above first spray level system 34 within vertical open tower 14, and a third circulation pump 42 which circulates through a fluidly connected absorption liquid circulation pipe 44, a limestone absorption liquid from the absorption liquid tank 20 to a fluidly connected third spray level system 46 positioned vertically above second spray level system 40 and the greatest distance from bottom 22 within vertical open tower 14. A vertical distance, illustrated as a distance CC in FIG. 1, between the mid-point of the first spray level system 34 and the mid-point of the second spray level system 40, as well as a vertical distance, also shown as a distance CC in FIG. 1, between the mid-point of the second spray level system 40 and the mid-point of the third spray level system 46, is approximately 1.25 meters (m) to approximately 3 m. A distance CC less than approximately 1.25 m is less preferable, since such distance tends to cause unwanted interactions between adjacent spray level systems, resulting in a decreased sulphur dioxide removal efficiency. A distance CC which greater than approximately 3 m is less preferable, since such distance tends to result in a very high overall height of the vertical open tower 14, increasing investment and operating costs associated therewith.

The first spray level system 34 comprises a first tubular portion 48 and a plurality of fluidly connected atomizing nozzles 50 and 52 that atomize or disperse as a finely divided spray a limestone absorption liquid circulated thereto by the pump 30. As such, the finely distributed limestone absorption liquid achieves effective contact with flue gas FG passing substantially vertically upwardly through the wet scrubber 12. The second spray level system 40 likewise comprises a second tubular portion 54 and a plurality of fluidly connected atomizing nozzles 50 and 52. The third spray level system 46 likewise comprises a third tubular portion 56 and a plurality of fluidly connected atomizing nozzles 50 and 52. The atomizing nozzles 50 and 52 of the second tubular portion 54 and third tubular portion 56 are of the same or of a similar type as the atomizing nozzles 50 and 52 of the first tubular portion 48.

All or a vast majority of atomizing nozzles 50 spray in a singular direction, i.e., in a cone pattern directed essentially downwardly within vertical open tower 14 counter current to the flow of flue gas FG therethrough. Atomizing nozzles 50 may, for example, be of the type 4CF-303120, available from Spraying Systems Co, Wheaton, Ill., USA. This type of atomizing nozzle 50 is operative for a liquid flow of about 70 $m^3$/hour, corresponding to 70000 liters/hour, or 1170 liters/minute, at a spraying pressure measured using water, of about 0.5 bar, as well as a liquid flow of about 107 $m^3$/hour, corresponding to 107000 liters/hour, or 1780 liters/minute, at a spraying pressure measured using water, of about 1.2 bar.

All of atomizing nozzles 52 are anti-clogging nozzles that spray in at least two directions, i.e., in a cone pattern directed essentially upwardly within vertical open tower 14 in essentially the same direction of flow as that of flue gas FG therethrough, and to a lesser extent, in a downwardly and/or a near downward direction counter current to the flow of flue gas FG through vertical open tower 14. Atomizing nozzles 52 of the type described herein are commercially available from Spraying Systems Co, Wheaton, Ill., USA. During operation of first spray level 34, second spray level 40 and/or third spray level 46, about 90% to about 99% or more of the absorption liquid sprayed from anti-clogging nozzles 52 is sprayed in a cone pattern upwardly from upward extending portion 58. As such, anti-clogging nozzle 52 is operative for an upward liquid flow of about 63 $m^3$/hour to about 69 $m^3$/hour, corresponding to about 63000 liters/hour to about 69000 liters/hour, or about 1050 liters/minute to about 1150 liters/minute, at a spraying pressure measured using water, of about 0.5 bar, as well as a liquid flow of about 96 $m^3$/hour to about 106 $m^3$/hour, corresponding to about 96000 liters/hour to about 106000 liters/hour, or about 1600 liters/minute to about 1766 liters/minute, at a spraying pressure measured using water, of about 1.2 bar. Alternatively, during operation of first spray level 34, second spray level 40 and/or third spray level 46, about 80% or more of the absorption liquid sprayed from anti-clogging nozzles 52 is sprayed in a cone pattern upwardly from upward extending portion 58.

During operation of first spray level 34, second spray level 40 and/or third spray level 46, about 10% to about 1% or less of the absorption liquid sprayed from anti-clogging nozzles 52 is sprayed downwardly and/or in a near downward direction from extended portions 60. As such, anti-clogging nozzle 52 is operative for an downward liquid flow of about 6.3 $m^3$/hour to about 6.9 $m^3$/hour, corresponding to about 6300 liters/hour to about 6900 liters/hour, or about 105 liters/minute to about 115 liters/minute, at a spraying pressure measured using water, of about 0.5 bar, as well as a liquid flow of about 9.6 $m^3$/hour to about 10.6 $m^3$/hour, corresponding to about 9600 liters/hour to about 10600 liters/hour, or about 160 liters/minute to about 176 liters/minute, at a spraying pressure measured using water, of about 1.2 bar. Alternatively, during operation of first spray level 34, second spray level 40 and/or third spray level 46, about 20% or less of the absorption liquid sprayed from anti-clogging nozzles 52 is sprayed downwardly and/or in a near downward direction from extended portions 60.

When first spray level 34, second spray level 40 and/or third spray level 46 are not in operation, little to no absorption liquid is sprayed from upward extending portions 58 while about 10% to about 1% or less, or alternatively about 20% or less, of the absorption liquid is sprayed downwardly and/or in a near downward direction from opposed extended portions 60. This continued fluid flow through extended portions 60 during periods of non-operation provides a direct drainage route for particulates collected in upward extending portions 58 thereby significantly reducing or eliminating particulate clogging thereof. As such, when not in operation, anti-clogging nozzles 52 maintain a liquid flow as needed from extended portion 60 of about 6.3 m$^3$/hour to about 6.9 m$^3$/hour, corresponding to about 6300 liters/hour to about 6900 liters/hour, or about 105 liters/minute to about 115 liters/minute, at a spraying pressure measured using water, of about 0.5 bar, as well as a liquid flow of about 9.6 m$^3$/hour to about 10.6 m$^3$/hour, corresponding to about 9600 liters/hour to about 10600 liters/hour, or about 160 liters/minute to about 176 liters/minute, at a spraying pressure measured using water, of about 1.2 bar. However, when not in operation, spraying pressure will typically be reduced thus reducing liquid flow to a level appropriate and a time period appropriate to prevent clogging of upward extending portion 58, depending on limestone and like particulate levels within wet scrubber 12.

Atomizing nozzles 50 and 52 are arranged in a specific pattern on first tubular portion 48, second tubular portion 54 and third tubular portion 56. As such, on each first, second and third tubular portions 48, 54 and 56 respectively, nozzles 50 are arranged to alternate with nozzles 52 along the lengths thereof. Also, on each first, second and third tubular portions 48, 54 and 56 respectively, nozzles 50 are each vertically arranged one above or nearly above another, and nozzles 52 are each vertically arranged one above or nearly above another. Nozzles 50 and 52 are so arranged to minimize spray interference between nozzles and maximize spray and flue gas FG contact for efficient flue gas FG cleaning. Optionally, rather than having two different types of nozzles 50 and 52 available for installation/maintenance purposes, only nozzles 52 could be utilized with half of nozzles 52 positioned with a majority of absorption liquid flow dispersed upwardly and the other half of nozzles 52 positioned with a majority of absorption liquid flow dispersed downwardly, thereby replacing nozzles 50. However, since nozzles 52 are typically more expensive than nozzles 50, such is not the preferred arrangement and therefore for purposes of clarity is not discussed further herein.

A mist eliminator 62 is located above the third spray level system 46. The mist eliminator 62 removes at least a portion of the absorption liquid droplets entrained by the cleaned flue gas, CG.

In wet scrubber 12, sulphur dioxide, SO$_2$, in the flue gas FG reacts with the limestone, CaCO$_3$, of the absorption liquid to form calcium sulphite, CaSO$_3$, which is subsequently oxidized to form gypsum, CaSO$_4$. The oxidation of calcium sulphite is preferably performed by bubbling air or oxygen gas through the absorption liquid using oxidation arrangement 24. Hence, the absorption liquid comprises, in addition to the limestone, also small amounts of calcium sulphite and, as a major constituent, gypsum. The gypsum formed through this process is removed from the absorption liquid tank 20 via a disposal pipe 64 and is forwarded to a gypsum dewatering unit, schematically indicated as belt filter 66. The dewatered gypsum may be commercially used, for example in wallboard production.

In addition to sulphur dioxide, SO$_2$, the wet scrubber 12 will remove, at least partly, also other contaminants from the flue gas FG. Examples of such other contaminants include sulphur trioxide, SO$_3$, hydrochloric acid, HCl, hydrofluoric acid, HF, and other acid contaminants. Still further, the wet scrubber 12 may also remove, at least partly, other types of contaminants from the flue gas, such as for example dust particles and mercury.

A control unit 68 controls operation of wet scrubber 12. To this end, a control device in the form of a first control valve 70 is provided on the first tubular portion 48 of the first spray level system 34, and a control device in the form of a second control valve 72 is provided on the second tubular portion 54 of the second spray level system 40. Furthermore, a control device in the form of a third control valve 74 is provided on the third tubular portion 56 of the third spray level system 46. The control unit 68 controls, individually, each of the valves 70, 72 and 74, for efficient operation of wet scrubber 12.

Figure 2:
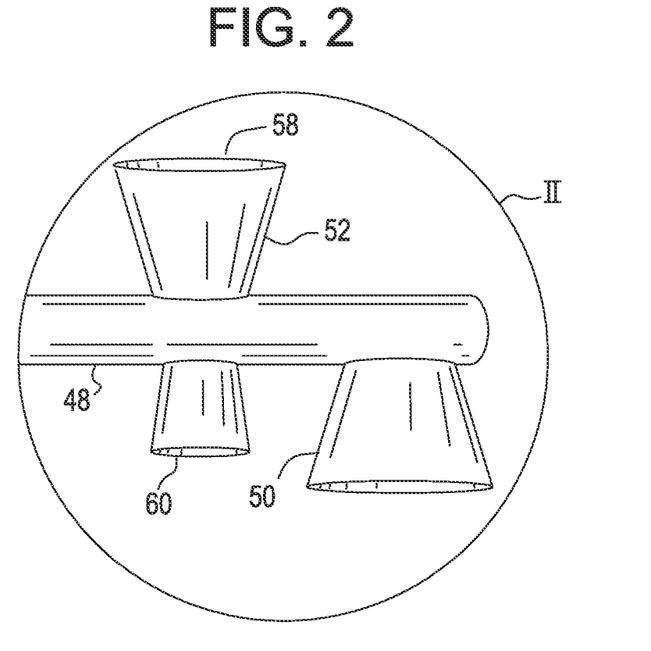

FIG. 2 schematically illustrates nozzles 50 and 52 of FIG. 1, circled and identified by reference II. As such, nozzle 50 sprays in a downward direction as described above, and nozzle 52 is a dual orifice anti-clogging nozzle that sprays absorption liquid predominantly in an upward direction from upward extending portion 58 and to a lesser extent in a downward direction from opposed extended portion 60.

Figure 3:
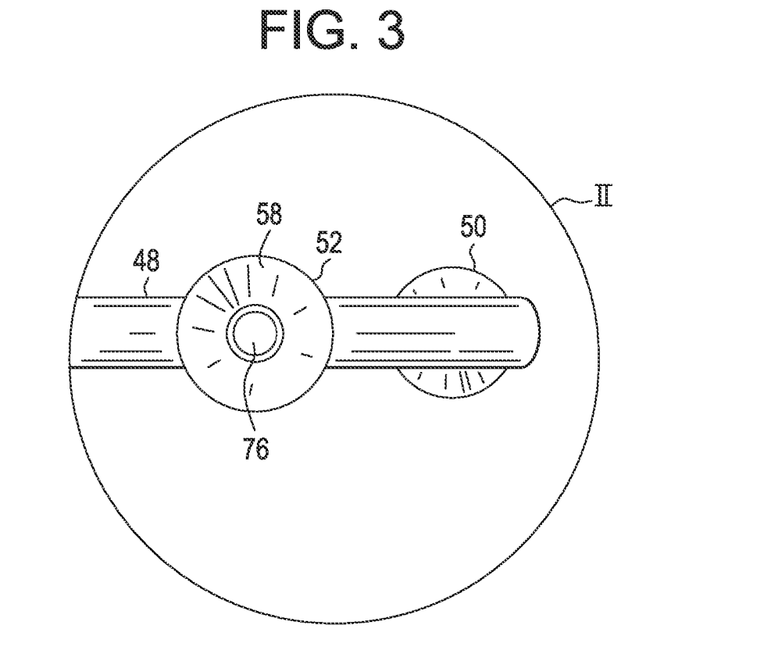

FIG. 3 schematically illustrates from a top view looking down into vertical open tower 14 nozzles 50 and 52 of FIG. 2. As such, within upward extending portion 58 is spray orifice 76 through which absorption liquid is dispersed from first tubular portion 48.

Figure 4:
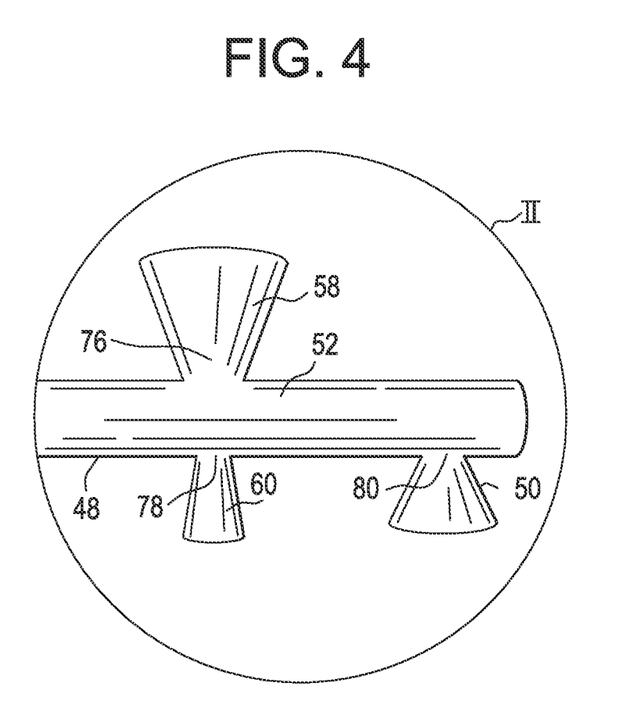

FIG. 4 again illustrates nozzles 50 and 52 of FIG. 2. Spray orifice 76 of upward extending portion 58 of nozzle 52 is sized approximately the same as that of spray orifice 80 of nozzle 50. However, spray orifice 78 within extended portion 60 of nozzle 52 is sized considerably smaller than spray orifices 76 and 80, since fluid flow therethrough is considerably less. Also, spray orifice 78 is aligned below and with that of spray orifice 76 to allow a flow of particulates from upward extending portion 58 downwardly through spray orifices 76 and 78 for release from extended portion 60 thereby significantly reducing or eliminating particulate clogging of upward extending portion 58.

In using the wet scrubber 12 to clean or treat a flue gas FG produced in a boiler 15, the flue gas FG is passed upwardly through wet scrubber 12 for contact with an absorption liquid, such as a limestone slurry or the like, atomized or dispersed as a finely divided spray from nozzles 50 and 52 arranged in a pattern on at least a first spray level 34 and a second spray level 40. The atomized or finely divided absorption liquid spray absorbs pollutants such as sulphur dioxide, hydrogen chloride and like acids from the flue gas upon contact therewith to produce a cleaned flue gas CG. To maximize absorption liquid and flue gas FG contact, nozzles 50 are arranged to alternate with nozzles 52 along lengths of at least first spray level 34 and second spray level 40, with nozzles 50 arranged vertically one above another and nozzles 52 arranged vertically above one another along the lengths of at least first spray level 34 and second spray level 40. Nozzles 50 are arranged vertically one above another and nozzles 52 are arranged vertically above one another on the at least first spray level 34 and second spray level 40 to maximize absorption liquid and flue gas FG contact while minimizing absorption liquid spray interference between nozzles. Additionally, nozzles 52 are anti-clogging nozzles with 90% or more fluid flow therethrough flowing from upward extending portion 58 and 10% or less fluid flow therethrough flowing from opposed extended portion 60, thereby providing a route of particulate flow from upward extending portion 58 to and out from opposed extended portion 60 to significantly reduce or eliminate particulate clogging of upward extending portion 58 when not in use. Alternatively, nozzles 52 are anti-clogging nozzles with 80% or more fluid flow therethrough flowing from upward extending portion 58 and 20% or less fluid flow therethrough flowing from opposed extended portion 60, thereby providing a route of particulate flow from upward extending portion 58 to and out from opposed extended portion 60 to significantly reduce or eliminate particulate clogging of upward extending portion 58 when not in use.

While the invention has been described with reference to a number of preferred embodiments, it will be understood by those skilled in the art that various changes may be made and equivalents may be substituted for elements thereof without departing from the scope of the present disclosure. In addition, many modifications may be made to adapt a particular situation or material to the teachings of the subject disclosure without departing from the essential scope thereof. Therefore, it is intended that the disclosure not be limited to the particular embodiments disclosed as the best mode contemplated for carrying out the same, but that the subject disclosure will include all embodiments falling within the scope of the appended claims. Moreover, the use of the terms first, second, etc. do not denote any order or importance, but rather the terms first, second, etc. are used to distinguish one element from another.

In summary, the subject apparatus or system 10 comprises a wet scrubber 12 with at least a first spray level 34 and a second spray level 40, each equipped with downwardly spraying nozzles 50 on each the first spray level 34 and the second spray level 40 arranged in vertical alignment one above the other, and upwardly spraying anti-clogging nozzles 52 alternating between the downwardly spraying nozzles 50 on each the first spray level 34 and the second spray level 40 also arranged in vertical alignment one above the other. Each of the upwardly spraying anti-clogging nozzles 52 has an opposed extended portion 60 operable for particulate flow from an upward extending portion 58 of the upwardly spraying anti-clogging nozzle 52 therethrough to prevent particulate clogging of the upward extending portion 58 when not in operation. The subject apparatus or system 10 may further comprise additional spray levels 13 equipped with like arranged downwardly spraying nozzles 50 and upwardly spraying anti-clogging nozzles 52, such as from 1 to 18 additional spray levels 13. As such, a flue gas FG from a boiler 15 flows upwardly through the wet scrubber 12 where an absorption liquid is atomized or sprayed from at least a portion of the downwardly spraying nozzles 50 and at least a portion of the upwardly spraying anti-clogging nozzles 52. Preferably, about 90% or more of the absorption liquid sprayed from the upwardly spraying anti-clogging nozzles 52 is sprayed upwardly from an upward extending portion 58 thereof and about 10% or less of the absorption liquid sprayed from the upwardly spraying anti-clogging nozzles 52 is sprayed downwardly from an opposed extended portion 60. Alternatively, about 80% or more of the absorption liquid sprayed from the upwardly spraying anti-clogging nozzles 52 is sprayed upwardly from an upward extending portion 58 thereof and about 20% or less of the absorption liquid sprayed from the upwardly spraying anti-clogging nozzles 52 is sprayed downwardly from an opposed extended portion 60. Absorption liquid so sprayed from each of the nozzles 50 and 52 contacts the flue gas FG flowing through the wet scrubber 12 absorbing acid gases therein to produce a cleaned flue gas CG. Preferably for this purpose, the absorption liquid is a limestone absorption liquid or slurry. As such, to significantly reduce or eliminate particulate clogging, the upwardly spraying anti-clogging nozzles 52 are operable for particulate removal from an upward extending portion 58 thereof through an aligned smaller sized extended portion 60.

In summary, the subject method comprises supplying an absorption liquid to a wet scrubber 12 with at least a first spray level 34 and a second spray level 40, each equipped with downwardly spraying nozzles 50 arranged in vertical alignment one above the other, and upwardly spraying anti-clogging nozzles 52 alternating between the downwardly spraying nozzles 50 also arranged in vertical alignment one above the other. Each of the upwardly spraying anti-clogging nozzles 52 includes an opposed downwardly draining extended portion 60 operable for particulate flow from an upward extending portion 58 of the upwardly spraying anti-clogging nozzle 52 to and out from extended portion 60 to prevent particulate clogging of the upward extending portion 58 of the upwardly spraying anti-clogging nozzle 52. The subject method further comprises contacting a flue gas FG produced in a boiler 15 flowing upwardly through the wet scrubber 12 with an absorption liquid spray to produce a cleaned flue gas CG. According to the subject method, the wet scrubber 12 may also include additional spray levels 13 equipped with like arranged downwardly spraying nozzles 50 and upwardly spraying anti-clogging nozzles 52. As such, the absorption liquid, preferably a limestone absorption liquid or slurry, is atomized or dispersed as a finely divided spray from at least a portion of the downwardly spraying nozzles 50 and at least a portion of the upwardly spraying anti-clogging nozzles 52. Preferably about 90% or more of the absorption liquid sprayed from the upwardly spraying anti-clogging nozzles 52 is sprayed upwardly from an upward extending portion 58 and about 10% or less of the absorption liquid sprayed from the upwardly spraying anti-clogging nozzles 52 is sprayed downwardly from an opposed extended portion 60. Alternatively, about 80% or more of the absorption liquid sprayed from the upwardly spraying anti-clogging nozzles 52 is sprayed upwardly from an upward extending portion 58 and about 20% or less of the absorption liquid sprayed from the upwardly spraying anti-clogging nozzles 52 is sprayed downwardly from an opposed extended portion 60. Accordingly, the upwardly spraying anti-clogging nozzles 52 are operable for particulate removal from the upward extending portion 58 through the opposed, smaller sized, extended portion 60.

It will be appreciated that numerous variants of the embodiments described above are possible within the scope of the appended claims.

The invention claimed is:

1. A system comprising:
   a wet scrubber with at least a first spray level and a second spray level;
   a circulation pump fluidly connected to each at least the first spray level and the second spray level;
   downwardly spraying nozzles on each the first spray level and the second spray level arranged in vertical alignment one above the other;
   upwardly spraying anti-clogging nozzles alternating between the downwardly spraying nozzles on each the first spray level and the second spray level also arranged in vertical alignment one above the other; and
   each upwardly spraying anti-clogging nozzle comprising an upward extending portion and an opposed extended portion operable for particulate flow from the upward extending portion to and out the opposed extended portion to prevent particulate clogging of the upward extending portion, wherein each of the upwardly spraying anti-clogging nozzles are operable for particulate removal from the upward extending portion out through opposed, smaller sized, extended portion in a downward spray.

2. The system of claim 1 further comprising additional spray levels equipped with like arranged downwardly spraying nozzles and upwardly spraying anti-clogging nozzles.

3. The system of claim 1 wherein a boiler is fluidly connected to the wet scrubber operable for flue gas flow upwardly through the wet scrubber.

4. The system of claim 1 wherein the downwardly spraying nozzles and at least a portion of the upwardly spraying anti-clogging nozzles are operable for atomizing or dispersing an absorption liquid.

5. The system of claim 1 wherein at least a portion of the downwardly spraying nozzles and at least a portion of the upwardly spraying anti-clogging nozzles are operable to atomize or disperse an absorption liquid, with about 80% or more, or about 90% or more of the absorption liquid sprayed from the upwardly spraying anti-clogging nozzles sprayed upwardly from an upward extending portion, and about 20% or less, or about 10% or less of the absorption liquid sprayed from the upwardly spraying anti-clogging nozzles sprayed downwardly from an opposed extended portion.

6. The system of claim 1 wherein each of the nozzles is operative for atomizing or dispersing an absorption liquid effective for contact with a flue gas flowing through the wet scrubber to produce a cleaned flue gas.

7. The system of claim 1 wherein each of the nozzles are operable to atomize or disperse a limestone absorption liquid or slurry.

8. A system comprising:
a wet scrubber with at least a first spray level and a second spray level;
downwardly spraying nozzles on each the first spray level and the second spray level arranged in vertical alignment one above the other;
upwardly spraying anti-clogging nozzles alternating between the downwardly spraying nozzles on each the first spray level and the second spray level also arranged in vertical alignment one above the other; and
each upwardly spraying anti-clogging nozzle comprising an upward extending portion and an opposed extended portion operable for particulate flow from the upward extending portion to and out the opposed extended portion to prevent particulate clogging of the upward extending portion, wherein each of the upwardly spraying anti-clogging nozzles are operable for particulate removal from the upward extending portion out through opposed, smaller sized, extended portion in a downward spray.

* * * * *